UNITED STATES PATENT OFFICE.

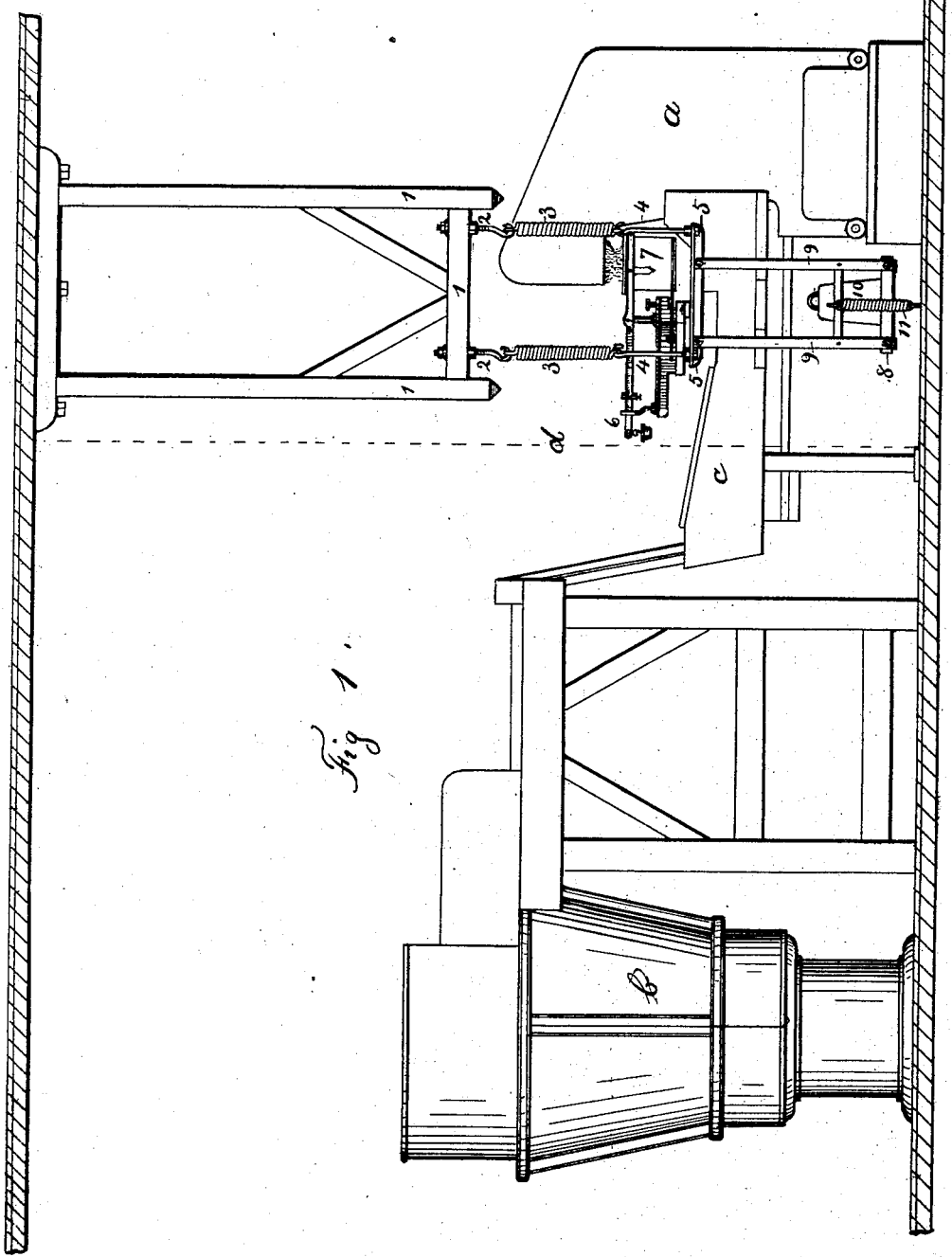

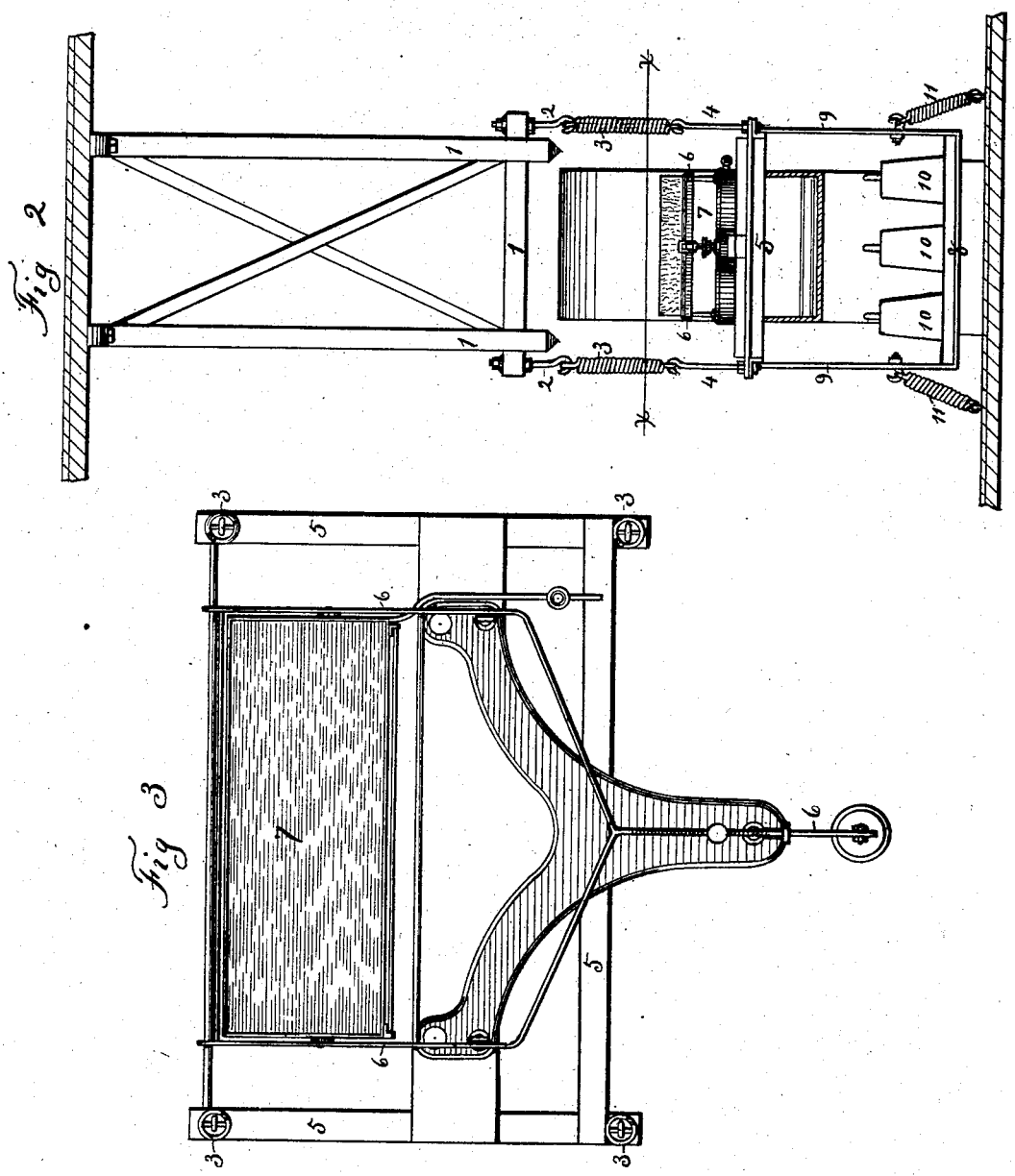

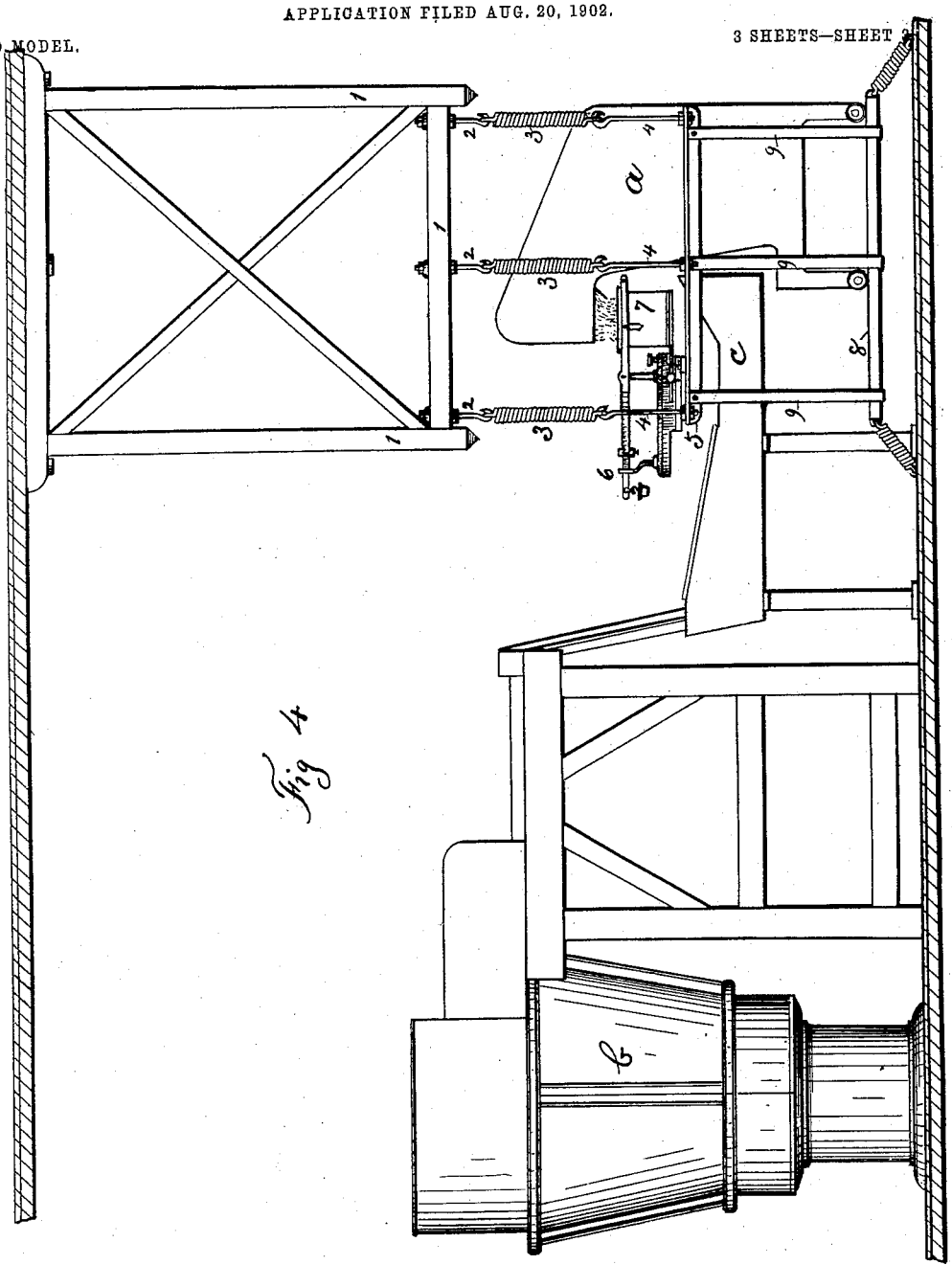

JAMES MARSHALL, OF FALL RIVER, MASSACHUSETTS, ASSIGNOR OF ONE-HALF TO PIERRE C. WARING, OF YONKERS, NEW YORK.

WEIGHING-MACHINE.

SPECIFICATION forming part of Letters Patent No. 720,042, dated February 10, 1903.

Application filed August 20, 1902. Serial No. 120,386. (No model.)

*To all whom it may concern:*

Be it known that I, JAMES MARSHALL, a citizen of the United States, residing at Fall River, in the county of Bristol and State of Massachusetts, have invented a new and useful Improvement in Weighing-Machines, of which the following is a specification.

My invention relates more especially to that class of machines where a predetermined quantity of material is automatically weighed off and delivered to a connecting machine, in which it is manufactured or formed into a requisite shape. Various forms of these machines are now in use having automatic weighing attachments, notably in hat-making, where the fur or wool is delivered by a feeding-machine to the weighing-machine, which weighs and delivers it in accurate predetermined quantities to the forming-machine, where it is made into hat-bodies of uniform weight. This device is chosen to illustrate the invention. The objection to the present state of the art is that in all this class of machines the weighing apparatus is constructed as a part of the connecting mechanism. It is firmly attached to and supported by the frame of the machine, which is in turn supported by the floor of the building in which it stands. It is found in many cases that the vibration caused by the operation of the machine or of adjacent machines in the same room impart a vibration to the floor or building and through it to the general mechanism, that destroys the sensitiveness of the weighing apparatus to such an extent as to render it inaccurate and in extreme cases useless.

The object of this invention is to remedy this difficulty by supporting the weighing apparatus independently of the floor or of any part of the framework of the machine and of providing means of taking up any trembling or vibration that may be communicated to the weighing apparatus from any part of the building containing it.

In the accompanying drawings like letters and figures of reference refer to like parts.

Figure 1 is a side elevation of the communicating parts of a self-feeding hat-forming machine provided with my improved weighing apparatus. Fig. 2 is a front elevation of the weighing apparatus on dotted line $d$ of Fig. 1. Fig. 3 is an enlarged plan view of the same on line $x$ of Fig. 2. Fig. 4 is an alternate construction in which the feeding mechanism is used as the tension-weight and the weights before shown dispensed with.

Referring to Fig. 1, $a$ is an automatic self-feeder.

$b$ is a hat-former.

$c$ is a connecting-passage through which the fed materials are conveyed to the former by means of a series of traveling aprons. This construction is only indicated and needs no explanation, as it is old and well known.

Between the feeder and the former is placed the weighing apparatus. Heretofore this apparatus has been firmly built in and solidly supported by the framework of the machine. In my invention it is entirely detached from the machine proper and is suspended in mid-air. To accomplish this, I construct a framework 1, pendent from the ceiling of the room above the machine a suitable distance. From the four corners of the frame depend hooked rods 2, which support four spiral springs 3 of suitably strong tension. From the lower end of the springs depend other hooked rods 4, which support a platform 5 at its four corners. The platform is preferably constructed of bar and angle iron, and on it is placed the weighing mechanism, consisting of the beam-scale 6 and drop-bottom receiving-pan 7. I secure the steadiness of the scale-platform by maintaining a constant tension on the springs. This I accomplish by means of the lower platform 8, which is suspended from the scale-platform by means of the bars 9 and loaded with the weights 10, which bear such relation to the strength of the springs as to impart stiffness and stability to the whole structure. Any vibration that may be imparted from the floor to the building and thence to the ceiling must pass entirely through the length of the springs to act on the weights with a disturbing force. It is found that such vibrations are taken up and lost in the spring-coils before reaching the weights and that the scale-platform is not affected by them. To stop any possible lateral swinging motion of the platforms, lower spiral springs 11 connect it laterally with the floor. The whole device is entirely independent of the other mechanism. Its operation is as follows: The scale-poise being set, as soon as the receiving-pan has received the requisite quantity of fur from the feeder it is deflected by its load. This brings it in contact with a discharging and resetting device, which is old, and therefore not illustrated or explained here. Such devices are in general use and are just as applicable to a suspended platform-scale as to a solidly-supported one.

It is evident that a free and independent scale-platform, as shown, might be supported by rods and springs without the frame 1 from the ceiling or by floor-standards having springs pendent from them supporting a weighted platform; but I think the construction shown is best adapted to the purpose. The springs also may be made of any materials that will take up vibratory action, and the platform may be supported in any desirable way that combines the elements of my invention.

In Fig. 4 I have shown an alternate construction in which all the elements of the invention are used, the weight of the feeding mechanism itself being made to furnish the necessary tension to the springs, and the separate weights 10 being dispensed with. In this case both the feeding mechanism and the weighing apparatus are placed upon the suspended platform. Intermittent communication with the former is made whenever the receiving-pan drops its load into the communicating passage c.

Having thus described my invention, what I claim, and desire to secure by Letters Patent, is—

1. In a machine having a feeding device, a weighing apparatus and a forming device in active communication with each other, the combination of a suspended platform carrying the weighing mechanism, placed between the feeding and forming devices, spiral springs suspending said platform from any convenient source of support not a part of the machine, and a subsidiary platform arranged below and connected to the weighing-platform, carrying weight to give tension to the springs substantially as described and shown.

2. In a weighing apparatus the combination of a platform, a scale-beam and receiving-pan supported thereon, tension-springs supporting said platform, a subsidiary platform arranged below and supported by the scale-platform, and means arranged upon said lower platform to exert a tensile strain upon the suspending-springs substantially as described and shown.

3. In a machine having an automatic feeding device, a weighing apparatus, and a forming device in active intermittent communication with each other, the combination of a platform suspended from springs attached to any convenient source of support not a part of the machine, a subsidiary platform arranged below the weighing-platform and connected with it, said feeding and weighing mechanism being detached from the forming mechanism, said feeding mechanism acting as the weight whereby a tensile strain is exerted upon the springs for the purpose of imparting stability to the weighing-platform, substantially as described and shown.

JAMES MARSHALL.

Witnesses:
BRONSON S. BURR,
THOS. D. TORNEY.